UNITED STATES PATENT OFFICE.

OTTO SCHMIDT AND ARTHUR ANDRES, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

COMPOUND SUITABLE FOR TANNING.

1,254,364.     Specification of Letters Patent.     Patented Jan. 22, 1918.

No Drawing.     Application filed March 23, 1914. Serial No. 826,610.

*To all whom it may concern:*

Be it known that we, OTTO SCHMIDT and ARTHUR ANDRES, citizens of the German Empire, residing at Ludwigshafen-on-the-Rhine, Germany, have invented new and useful Improvements in Compounds Suitable for Tanning, of which the following is a specification.

We have discovered that we can prepare a new class of sulfonated compounds by causing a phenolic body containing not more than one hydroxyl group in each nucleus, sulfuric acid and an aldehyde containing at least two carbon atoms, to react on one another in such a manner that the product contains at least one sulfonic acid group in the molecule. The order in which the initial materials are brought together is immaterial for the purposes of this invention. For instance, the three compounds may be directly mixed together, or the phenol and the aldehyde may first react upon one another, and the product be treated with sulfuric acid, but we do not restrict our invention to these specifically mentioned methods. For the purposes of this invention, a compound which gives rise to an aldehyde containing at least two carbon atoms, is regarded as equivalent to such aldehyde. Our new compounds, in the form of their free acids, are characterized by possessing a non-crystalline structure, they are readily soluble in water, yielding almost colorless solutions which become deeply colored on the addition of a ferric salt, and they tan hides, giving a useful leather. They contain at least two aromatic residues joined together by a residue containing at least two carbon atoms.

The following example will serve to illustrate how this invention may be performed, but the invention is not confined to this example. The parts are by weight.

Example: Shake together for some time, 94 parts of phenol, 22 parts of paraldehyde, and a small quantity of concentrated sulfuric acid. As reaction takes place heat is evolved, and care should be taken that the temperature does not rise above 90° C. When the reaction is complete, add 100 parts of 97% sulfuric acid and stir, while warming gently, until the reaction product is soluble in water. Take a concentrated solution of this compound, partially neutralize it with caustic soda solution and then dilute it with water until a solution of $2\frac{1}{2}°$ Baumé is obtained. Then add ten grams of common salt to each liter of this solution and employ it for tanning. Leather is obtained which, after being treated with fat, possesses a good resistance to tearing.

Now what we claim is:—

1. The process of producing water-soluble material suitable for use in tanning which consists in causing a phenolic body containing not more than one hydroxyl group in each nucleus, sulfuric acid and an aldehyde containing at least two carbon atoms, to react on one another in such a manner that the product contains at least one sulfonic acid group in the molecule.

2. The process of producing water-soluble material suitable for use in tanning by condensing together phenol, paraldehyde and sulfuric acid in such a manner that the product contains at least one sulfonic acid group in the molecule.

3. As new articles of manufacture, sulfonated condensation products of a phenolic body containing not more than one phenolic hydroxyl group in each nucleus, with sulfuric acid and an aldehyde containing at least two carbon atoms, which new compounds are light colored non-crystalline bodies containing sulfur, which are soluble in water, yielding almost colorless solutions, which become deeply colored on the addition of a solution of ferric salt and which tan hides, giving useful leather, and which contain at least two aromatic residues joined together by a residue containing at least two carbon atoms.

4. As new articles of manufacture, the sulfonated condensation product from phenol, and paraldehyde, which product is a light colored amorphous body, containing sulfur, is soluble in water yielding an almost colorless solution, which becomes deeply colored on the addition of a solution of a ferric salt, which tans hides, giving a useful leather, and which contains at least two phenolic residues joined together by an acetaldehyde residue.

In testimony whereof we have hereunto set our hands in the presence of two subscribing witnesses.

OTTO SCHMIDT.
ARTHUR ANDRES.

Witnesses:
J. ALEC LLOYD,
S. S. BERGER.